United States Patent [19]
Miyashita et al.

[11] Patent Number: 5,466,883
[45] Date of Patent: Nov. 14, 1995

[54] KARAOKE REPRODUCING APPARATUS

[75] Inventors: Masahiko Miyashita, Tokorozawa; Tatsuyuki Miyazawa; Hiroshi Fujii, both of Tokyo; Sumio Hosaka, Tokorozawa; Kouichi Ono; Yoshiaki Moriyama, both of Tsurugashima, all of Japan

[73] Assignee: Pioneer Electronic Corporation, Tokyo, Japan

[21] Appl. No.: 249,036

[22] Filed: May 25, 1994

[30] Foreign Application Priority Data

May 26, 1993 [JP] Japan .................................. 5-124070

[51] Int. Cl.⁶ .............................. G10H 1/26; G10H 1/36
[52] U.S. Cl. ................................................ 84/610; 84/634
[58] Field of Search ............................ 84/602, 609–614, 84/634–638, 645

[56] References Cited

U.S. PATENT DOCUMENTS 5,250,747  10/1993  Tsumura ..................................... 84/645

Primary Examiner—Stanley J. Witkowski
Attorney, Agent, or Firm—Sughrue, Mion, Zinn, Macpeak & Seas

[57] ABSTRACT

A karaoke reproducing apparatus which allows a user to specify one vocal part or both vocal parts of two parts when one piece of music selected from a plurality of pieces of music by the user is a multi-audio type, reproduces only instrumental accompaniment (karaoke) when both parts are specified, and reproduces the vocal sounds of an unspecified one of the two parts together with the instrumental accompaniment when only one part is specified.

2 Claims, 8 Drawing Sheets

FIG.6

| PLAYING ORDER | MUSIC SELECTION NUMBER | VOCAL PART DATA |
|---|---|---|
| 1 | 7 6 0 4 | 0 0 |
| 2 | 1 2 1 0 | 0 1 |
| 3 | 3 4 0 6 | 0 0 |
| 4 | 5 4 1 2 | 1 0 |
| ⋮ | ⋮ | ⋮ |

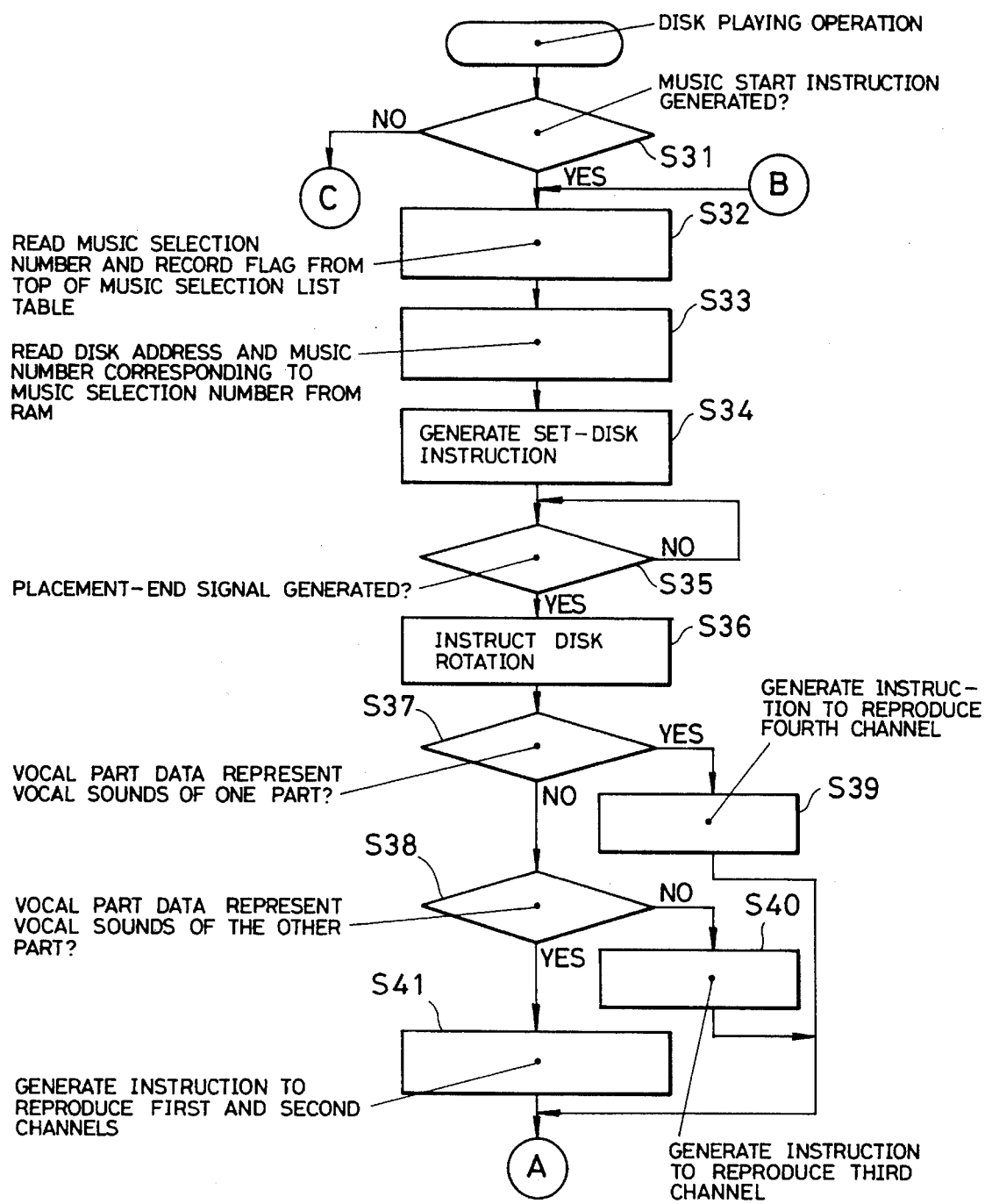

KARAOKE REPRODUCING APPARATUS

BACKGROUND OF THE INVENTION

1. Field of the Invention

The present invention relates to a karaoke reproducing apparatus that is equipped with a recording medium on which pieces of karaoke music or instrumental accompaniment for a plurality of pieces of music are recorded, and reproduces or plays any selected music among those pieces of karaoke music.

2. Description of the Related Art

Pieces of karaoke music (instrumental accompaniment) include one-part or solo songs for one person to sing along and two-part songs for two persons (duet) to sing along. The latter type of two-part song is normally sung by two singers. Thus, a person who wants to sing a two-part song must have a partner to sing together. However, there may be a case where such a partner cannot be found.

SUMMARY OF THE INVENTION

It is therefore an object of the present invention to provide a karaoke reproducing apparatus which allows even a single person to sing a two-part song in duet.

To achieve the above object, a karaoke reproducing apparatus according to this invention comprises a recording medium having a main channel on which signals each representing instrumental accompaniment of each of a plurality of pieces of music are recorded, and two subchannels for multi-audio music having two vocal parts, included in the plural pieces of music, one of the subchannels being recorded with a signal representing at least vocal sounds of one of two parts and the other subchannel being recorded with a signal representing at least vocal sounds of the other one of the two parts; means for generating a music selection instruction indicating one piece of music among the plurality of pieces of music in accordance with an operation; playing means for playing the recording medium for the one piece of music specified by the music selection instruction; discrimination means for discriminating whether or not the one piece of music specified by the music selection instruction is a multi-audio type; means for designating one of vocal parts of two parts or both vocal parts thereof when the one piece of music specified by the music selection instruction is determined as a multi-audio type by the discrimination means; and reproducing means for reproducing a signal on at least one of the main channel and the two subchannels which is associated with the designated vocal part or vocal parts, when the recording medium is played by the playing means.

The karaoke reproducing apparatus according to the present invention allows a user to specify one vocal part or both vocal parts of two parts when one piece of music selected from a plurality of pieces of music by the user is a multi-audio type, reproduces only instrumental accompaniment (karaoke) when both parts are specified, and reproduces the vocal sounds of an unspecified one of the two parts together with the instrumental accompaniment when only one part is specified.

BRIEF DESCRIPTION OF THE DRAWINGS

FIG. 6 is a diagram showing a music selection list table; and

FIGS. 7A and 7B are flowcharts illustrating a disk playing operation.

DETAILED DESCRIPTION OF THE PREFERRED EMBODIMENT

A preferred embodiment of the present invention will now be described referring to the accompanying drawings.

Figure 1:
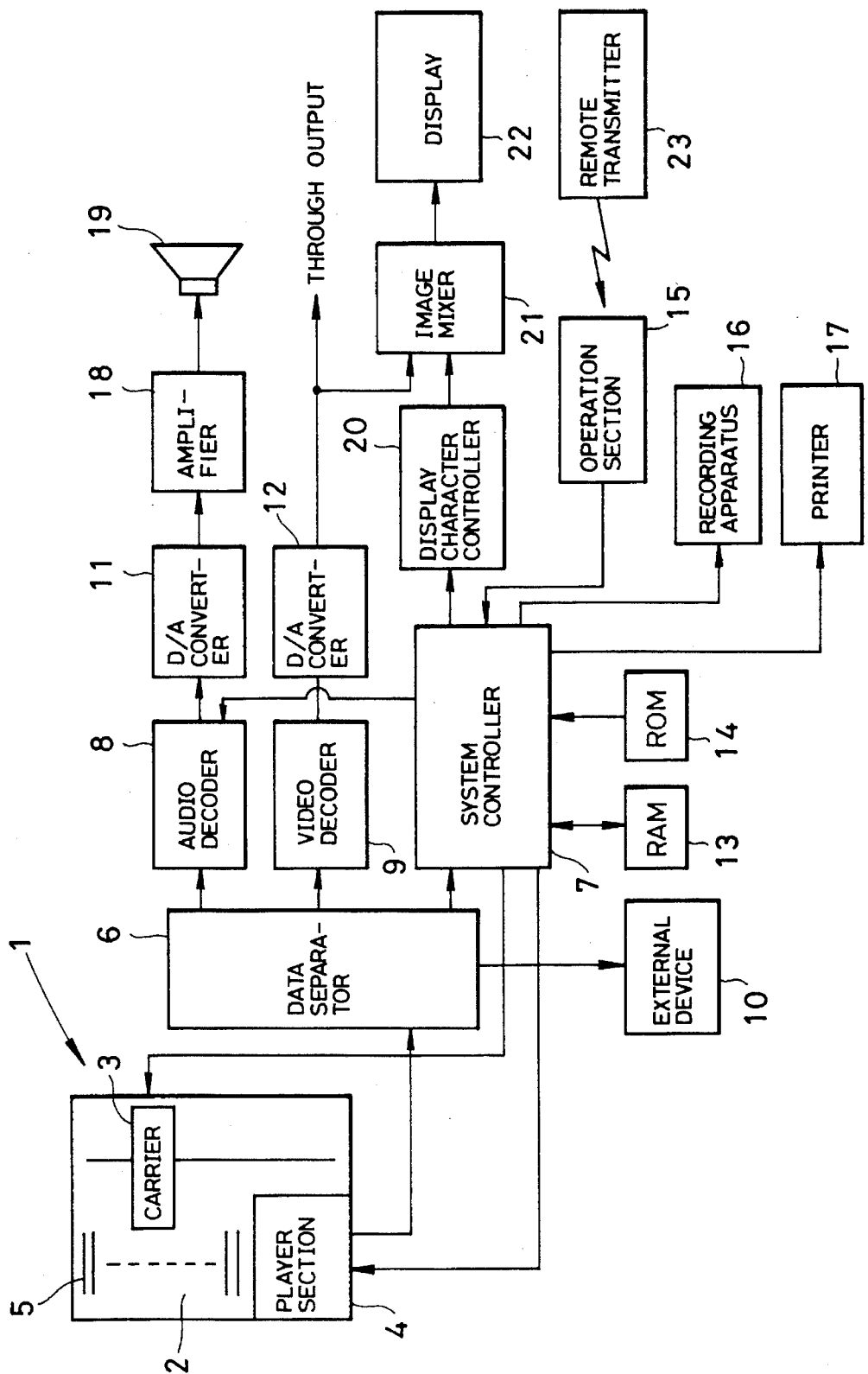
FIG. 1 is a block diagram illustrating one embodiment of the present invention.

In a karaoke reproducing apparatus shown in FIG. 1, an auto-changer 1 has a disk stocker 2, a disk carrier 3 and a player section 4. The disk stocker 2 retains a plurality of disks 5 one of which is selectively moved on the turn table (not shown) of the player section 4 by the disk carrier 3 to play the disk. When the playing of the disk is complete, the disk on the turn table is returned to a predetermined position in the disk stocker 2 by the disk carrier 3. The player section 4 plays the disk on the turn table to output read data. The disk carrier 3 and the player section 4 operate in accordance with an instruction from a system controller 7 which will be described later.

The data output of the player section 4 is connected to a data separator 6. The data separator 6 separates the data output from the player section 4 to various types of data, such as compressed image data, compressed audio data, control data and information data, and send those different types of data from respective output terminals. The data separator 6 is connected to an audio decoder 8 and a video decoder 9 as well as the system controller 7. The data separator 6 also has a terminal which connects to an external device 10. The external device 10 is a controller for illumination, video images, superimposition, etc.

The audio decoder 8 decodes the separated compressed audio data to restore it as uncompressed audio data, such as PCM digital data. Since the compressed audio data contains four channels of audio data in compressed form, a specified channel of audio data will be restored in accordance with a channel instruction from the system controller 7. The audio data output from the audio decoder 8 is supplied to a D/A converter 11 to be converted into an analog audio signal. The analog audio signal is supplied via an amplifier 18 to a loudspeaker 19.

A video decoder 9 decodes compressed image data, separated by the data separator 6, and restores it as uncompressed image data. The image data from the video decoder 9 is supplied to a D/A converter 12 to be converted to an analog dynamic video signal. This dynamic video signal is directly output as a through output signal as well as is supplied to an image synthesizer 21.

The system controller 7, constituted of a microcomputer, receives separated information data. The information data is stored in a RAM (Random Access Memory) 13 and is selectively read therefrom. The read information data is processed inside the system controller 7 and is supplied to a display character controller 20. The display character controller 20 has a character generator and a V-RAM, and generates display character data according to the information data and writes the data in the V-RAM. The display character controller 20 reads the display character data from the V-RAM in synchronism with a sync signal in the dynamic video signal, and converts the data into a character video signal, which is output to the image mixer 21. The character video signal is mixed with the dynamic video signal from the D/A converter 12 in the image mixer 21.

The system controller 7 is connected with an operation section 15, a recording apparatus 16 and a printer 17. The operation section 15 has a keyboard for specifying a piece of music and a receiving section (not shown) for accepting the music designation made through a remote control transmitter 23. The recording apparatus 16 serves to record instrumental accompaniment or karaoke music and vocal sounds on a recordable compact disk (not shown), such as a CD-R. Audio signals representing the music and vocal sounds are supplied to the recording apparatus 16 from the amplifier 18. The printer 17 prints information of recorded pieces of music, such as the titles of music, on a label that is to be stuck on a compact disk.

Figure 2:
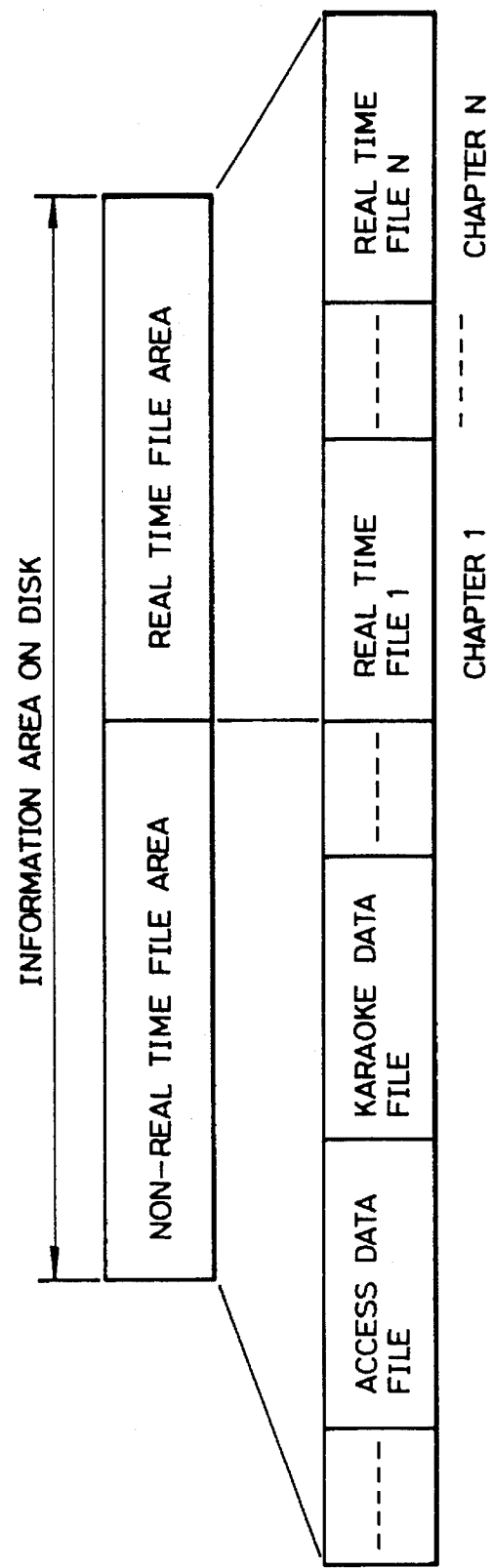
FIG. 2 is a diagram showing the constitution of an information area on a disk.

A description will now be given of the recorded contents of the disks 5 that are played by the player section 4. Pieces of information are all recorded on each disk 5 in the form of a digital signal that conforms to the MPEG (Moving Picture Expert Group) standards. As shown in FIG. 2, the data recording area on each disk 5 has a non-real time file area and a real time file area. An access data file, such as TOC, and a karaoke data file, such as a music title, are recorded in the non-real time file area. N real time files (N: an integer corresponding to the number of pieces of music) are recorded in the real time file area. Each real time file is a unit called "chapter" and one chapter is equivalent to one piece of music. One chapter of a real time file consists of compressed image data, compressed audio data and real time data other than the image and audio data. Those data are recorded in the file in a time-division multiplex manner.

Compressed audio data includes four channels of audio signals, a stereo audio signal as karaoke music is recorded on first and second channels as main channels. Third and fourth channels are subchannels. In the case of a song having two parts like a duet song, audio signal including the vocal sounds of one part and the karaoke music is recorded on the third channel while audio signal including the vocal sounds of the other part and the karaoke music is recorded on the fourth channel. With regard to a piece of music having the vocal sounds of the individual parts recorded separately on the third and fourth channels, those vocal data are recorded previously on a disk as multi-audio mode data included in the common data in the chapter, which will be discussed later. The "multi-audio" is a recording mode in which the acoustic parts of the same music are recorded on each of a plurality of audio channels in accordance with time. Here, the multi-audio mode indicates whether or not a piece of music is a multi-audio type which has vocal sounds of the individual parts recorded together with the karaoke music respectively on the third and fourth channels among four audio channels.

Figure 3:
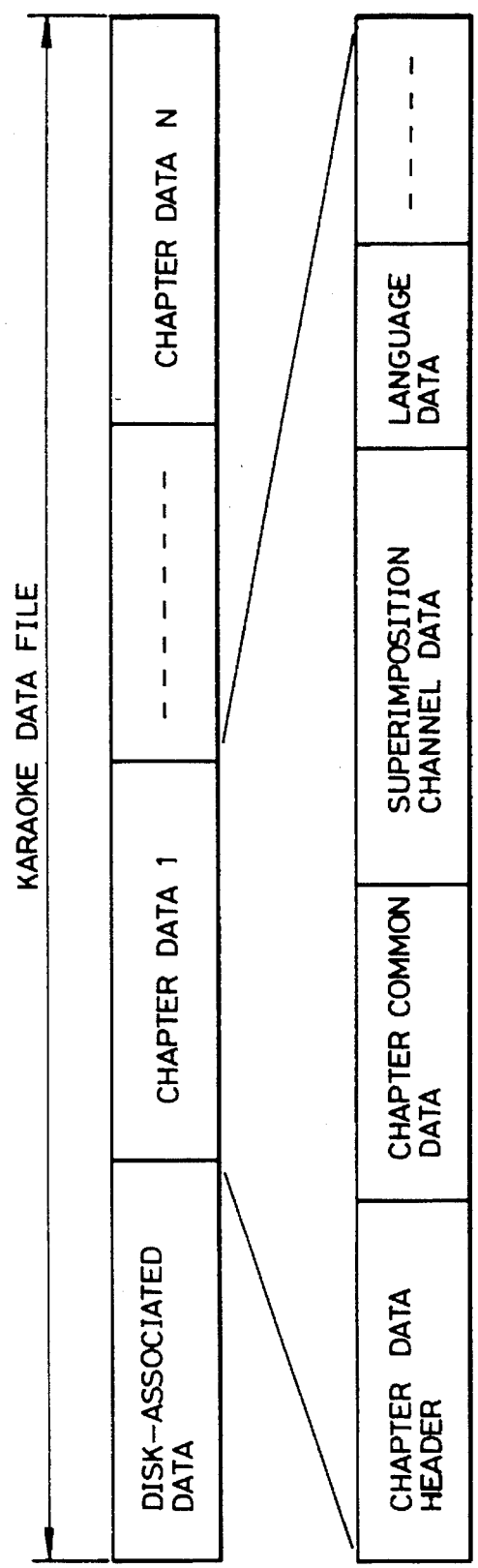
FIG. 3 is a diagram showing the constitution of a karaoke information file.

The access data file includes data representing the position of each chapter on a disk and the time length of that chapter, so that any chapter can be accessed by referring to the data. The karaoke data file whose structure is shown in FIG. 3 includes various kinds of data relating to the disk and music. The karaoke data file consists of data associated with a disk and one or more pieces of chapter data. One chapter data represents one chapter or data associated with one piece of music, and the number of pieces of chapter data matches with the number of pieces of music. The disk-associated data is associated with the entire disk, such as the contents of the disk, the discrimination of the disk itself, and data relating to the number of pieces of music recorded on that disk.

Each chapter data includes a chapter data header, chapter common data, superimposition channel data and language data. The chapter data header includes discrimination data of chapter data and data showing the contents. The chapter common data includes (1) the nationality of music, (2) the presented date of music, (3) the music length, (4) a copyright code, (5) singer classification, (6) the genre of music, (7) the subject image and theme of music, (8) music situation, (9) the special genre of music, (10) music tempo, (11) the image of music scene, (12) the difficulty of music, (13) a multi-audio mode, (14) background video, (15) control equipment data and (16) DSP mode.

The superimposition channel data is data relating to character data corresponding to that chapter. It is possible to assign a plurality of character data systems (superimposition channels) for one chapter; for example, superimposition characters in a plurality of different languages which are selectable may be affixed to one chapter. The superimposition channel data includes (1) the number of superimposition channels, (2) a superimposition channel number, (3) a superimposition language and (4) the type of superimposition characters. The superimposition channel number, superimposition language and superimposition character type are recorded repeatedly by the number of superimposition channels.

The language data depends on the language among different pieces of data relating to the chapter, and includes (1) the number of pieces of language data, (2) a language code, (3) a discriminative code system, (4) a language data size, (5) a music title, (6) reading of the music title, (7) the name of the singer, (8) reading of the singer, (9) the name of the songwriter, (10) reading of the songwriter, (11) the name of the composer, (12) reading of the composer, (13) a first phrase, (14) reading of the first phrase, and (15) location data. Those data from the language code (2) to the location data (15) are recorded repeatedly by the number of pieces of language data.

The operation of the above-described karaoke reproducing apparatus will be described below.

Figure 4:
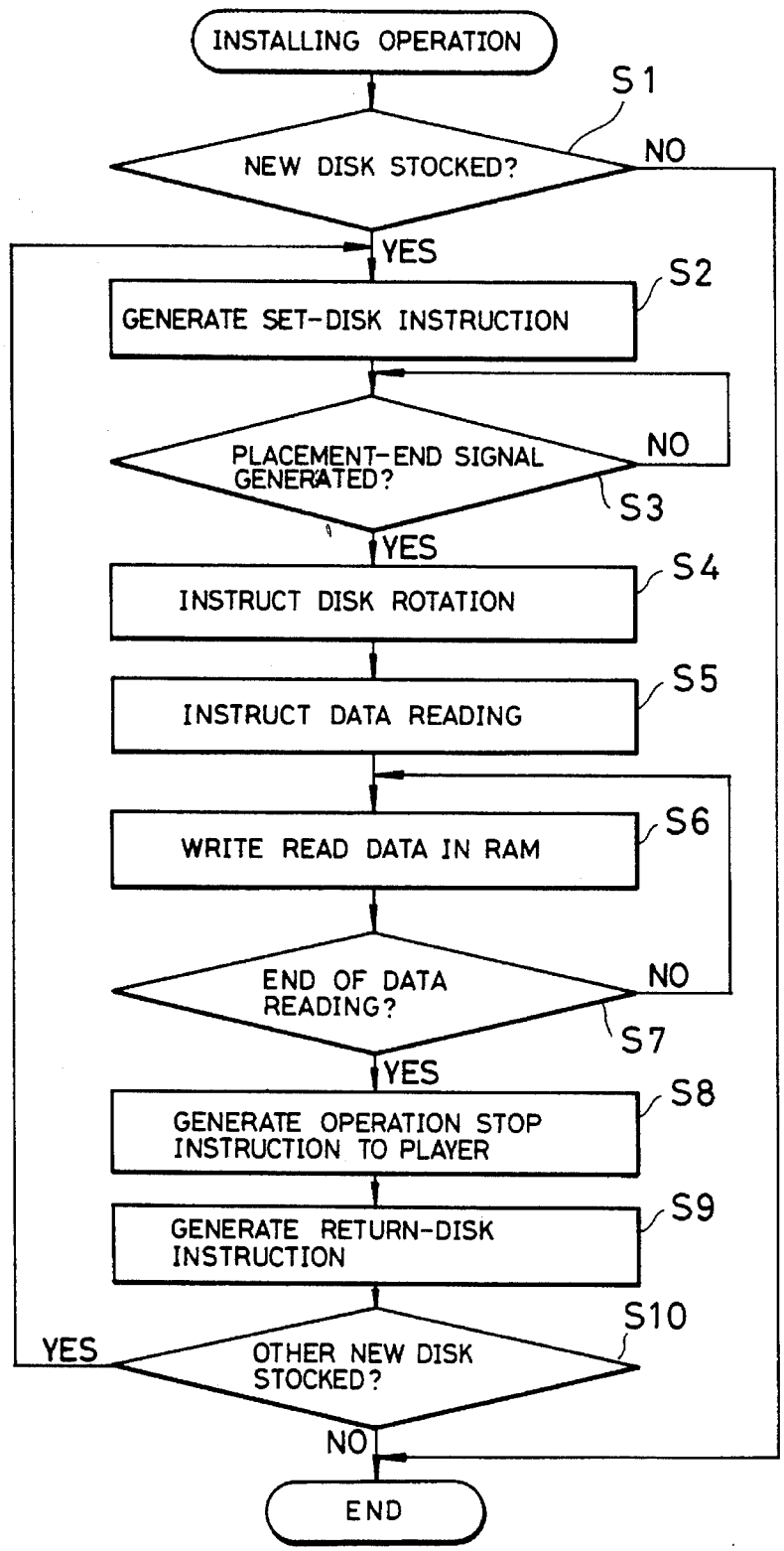
FIG. 4 is a flowchart illustrating an install operation.

To stock a new disk in the disk stocker 2 of the autochanger 1, an installing operation is performed first. In the operation, when detecting that a new disk has been placed in the disk stocker 2 (step S1) as shown in FIG. 4, the system controller 7 sends a set-disk instruction to the disk carrier 3 to place that disk on the turn table of the player section 4 (step S2). When the disk carrier 3 finishes placing the disk on the turn table of the player section 4, the disk carrier 3 sends a placement-end signal, representing the end of disk placement, to the system controller 7. When receiving the placement-end signal (step S3), the system controller 7 instructs the player section 4 to rotate the disk (step S4) and read data therefrom (step S5). The player section 4 rotates the disk together with the turn table, reads data from the non-real time file area on the disk after the rotational speed reaches a predetermined speed, and then outputs the data. The read data is supplied via the data separator 6 to the system controller 7 and is temporarily stored in a buffer memory (not shown) in the system controller 7. The system controller 7 sequentially writes the received data in the external RAM 13 (step S6), and discriminates whether or not the data reading by the player section 4 has completed (step S7). For instance, the system controller 7 performs the process in step S6 to write the supplied data in the RAM 13 until it receives a bit indicating the end of data supply and understands that the data reading has completed. When the data reading is completed, the system controller 7 sends an operation stop instruction to the player section 4 (step S8) and sends a return-disk instruction to the disk carrier 3 (step S9). As a result, the player section 4 stops rotating the turn table, after which the disk carrier 3 moves the disk on the turn table to its specified disk position in the disk stocker 2. After executing step S9, the system controller 7 determines if any other new disk has been placed in the disk stocker 2 (step S10). If there is another new disk placed in the disk stocker 2, the system controller 7 proceeds to step S2. If no other new disk has been placed, the install operation will be terminated.

While the data to be written in the RAM 13 may be all the data in the access data file and karaoke data file, the data to be written may be music data which includes at least the disk number specific to each disk, the address indicating the disk position in the disk stocker 2, the title of music, the name of the singer, the name of the songwriter, the name of the composer, the length of music, the copyright code, the genre of music, the music tempo, the difficulty of music, and the multi-audio mode.

The placement of a new disk may be detected from an input through the operation section 15 by the user. Alternatively, a sensor for detecting the presence or absence of a disk may be provided at each disk position in the disk stocker 2 and an area for storing the detection results may be provided in the RAM 13, so that every time the installing operation is executed, the detection outputs of all the sensors are compared with the memory contents of the RAM 13 to detect the placement of any new disk and the detection results are written in the RAM 13.

Although the music data, such as a title of music, is obtained at the time a disk having both image data and audio data recorded thereon is installed in this embodiment, such music data may be acquired from a special disk on which only music data like the title of music is recorded at the time the special disk is installed. Alternatively, music data of a plurality of disks each having both image data and audio data recorded thereon may be recorded in one of the disks, so that the entire music data can be acquired when the particular disk is installed.

Figure 5:
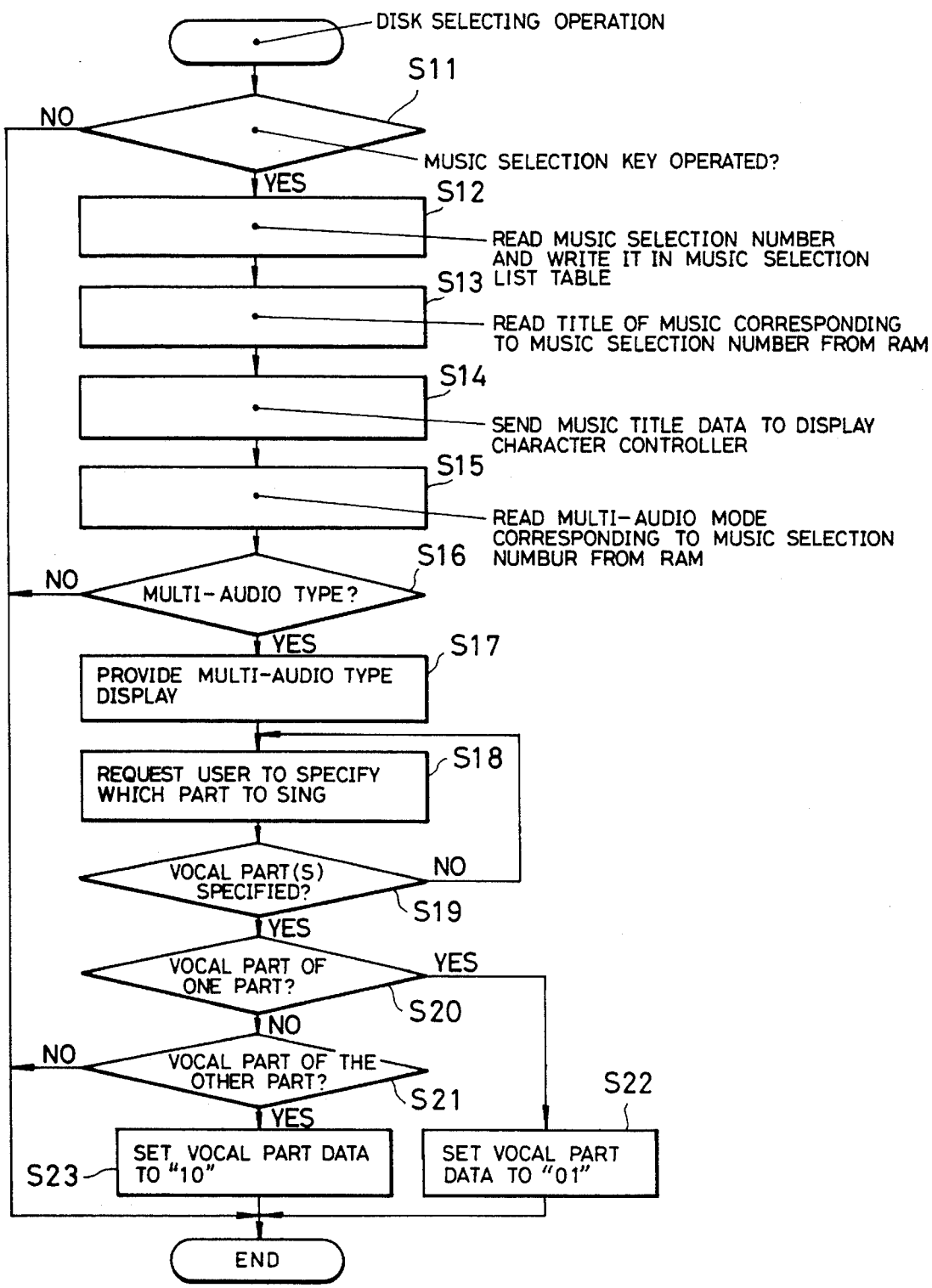
FIG. 5 is a flowchart illustrating a music selecting operation.

After the above-described installing operation is performed, karaoke for the music selected by any user can be performed. In the music selecting operation, the user first enters the desired music selection number using the numerical keys or alphabetical keys of the operation section 15 or the remote controller 23. Each music selection number consists of a plurality of digits specifying a disk and a piece of music recorded on that disk. When the music selection number is keyed in, it is saved in a buffer (not shown) in the operation section 15. As shown in FIG. 5, the system controller 7 determines if a music selection-key (not shown) on the operation section 15 has been operated, at every predetermined timing or in every interruption (step S11). When detecting the operation of the music selection key, the system controller 7 reads the music selection number from the buffer and writes it in a music selection list table in the RAM 13 (step S12). The music selection list table, provided in the RAM 13, contains a list of music selection numbers and associated vocal part data as described later in playing order as shown in FIG. 6, and the order moves up when playing of the top music in the list is completed. The system controller 7 reads the title of music corresponding to the music selection number from the RAM 13 as information data (step S13), and sends the information data to the display character controller 20 (step S14). The display character controller 20 generates display character data indicating the title of music, which is written at a predetermined position in the V-RAM. After the display character data is read from the V-RAM and converted to a character video signal, the video signal is output to the image mixer 21. When the character video signal indicates a predetermined color, the image mixer 21 outputs the character video signal instead of the dynamic video signal from the D/A converter 12, so that the character video signal is mixed with the dynamic video signal. Consequently, the title of music is displayed as a character image on the display 22 so that the user can confirm that the selected music has been accepted.

After executing step S14, the system controller 7 reads the multi-audio mode corresponding to the read music selection number from the RAM 13 (step S15). Since the data read from the disk and written in the RAM 13 at the installation time includes the multi-audio mode, the system controller 7 reads it in step S15. As mentioned earlier, the multi-audio mode indicates whether or not a piece of music is a multi-audio type which has vocal sounds of the individual parts recorded together with the karaoke music respectively on the third and fourth channels among four audio channels. On the basis of the read multi-audio mode, the system controller 7 determines if the selected piece of music is a multi-audio type (step S16). For example, the multi-audio mode of "1" indicates a multi-audio type, and the multi-audio mode of "0" indicates a non-multi-audio type. If the selected piece of music is a multi-audio type, therefore, the system controller 7 provides the display character controller 20 a display instruction relating to the multi-audio type in order to perform a multi-audio type display on the display 22 (step S17), and requests the user to specify which part of that music the user wants to sing (step S18). As a multi-audio type of music is a two-part song, the user should specify the intended part, both parts, one of the parts (e.g., male part) or the other part (e.g., female part), by operating the keys on the operation section 15. The selection may easily be accomplished by allowing the user to select the desired numeral or alphabet indicating the intended part (or parts) from among those displayed on the display 22.

After executing step S18, the system controller 7 determines if a vocal part or vocal parts have been specified (step S19). With the selection state, the system controller 7 then determines whether the user has selected one part (first part) or the other part (second part) (steps S20 and S21). If it is the first part, the vocal part data in the music selection list table is set to "01" (step S22), while if it is the second part, the vocal part data in the music selection list table is set to "10" (step S23). The data is written at the position of the vocal part data which is associated with the position of the music selection number written in step S12. If neither part has been selected, which means that case both parts have been selected, the vocal part data in the music selection list table will not be changed from the initial setting of "00".

When the selected piece of music is determined as a non-multi-audio type in step S16, the music selecting operation will be terminated immediately.

The disk playing operation will now be described. When the start of the music is instructed by a key operation on the operation section 15 (step S31), the system controller 7 reads the music selection number and vocal part data from the top of the music selection list table formed in the RAM 13 (step S32), as shown in FIG. 7A. The system controller 7 then reads the disk address and the music number, associated with the read music selection number, from the RAM 13 (step S33), and sends the set-disk instruction to the disk carrier 3 to move the disk existing at the read disk address onto the turn table of the player section 4 (step S34). When the disk carrier 3 finishes placing the disk on the turn table of the player section 4, the disk carrier 3 sends the placement-end signal, indicating the end of disk placement, to the system controller 7. Upon reception of the placement-end signal (step S35), the system controller 7 instructs the player section 4 to rotate the disk (step S36).

After executing step S36, the system controller 7 determines whether the read vocal part data represents the vocal sounds of the first part or the vocal sounds of the second part (steps S37 and S38). If the vocal part data represents the vocal sounds of the first part, the system controller 7 sends a 4th-channel playback instruction to the audio decoder 8 (step S39). If the vocal part data is for the second part, on the other hand, the system controller 7 sends a 3rd-channel playback instruction to the audio decoder 8 (step S40). If the vocal part data indicates neither the vocal sounds for the first part nor those for the second part, the system controller 7 sends a playback instruction for reproducing both the first and second channels to the audio decoder 8 (step S41). The audio decoder 8 decodes the compressed audio data on the channel or channels specified by the received channel playback instruction, and restores it to uncompressed audio data.

Figure 7B:
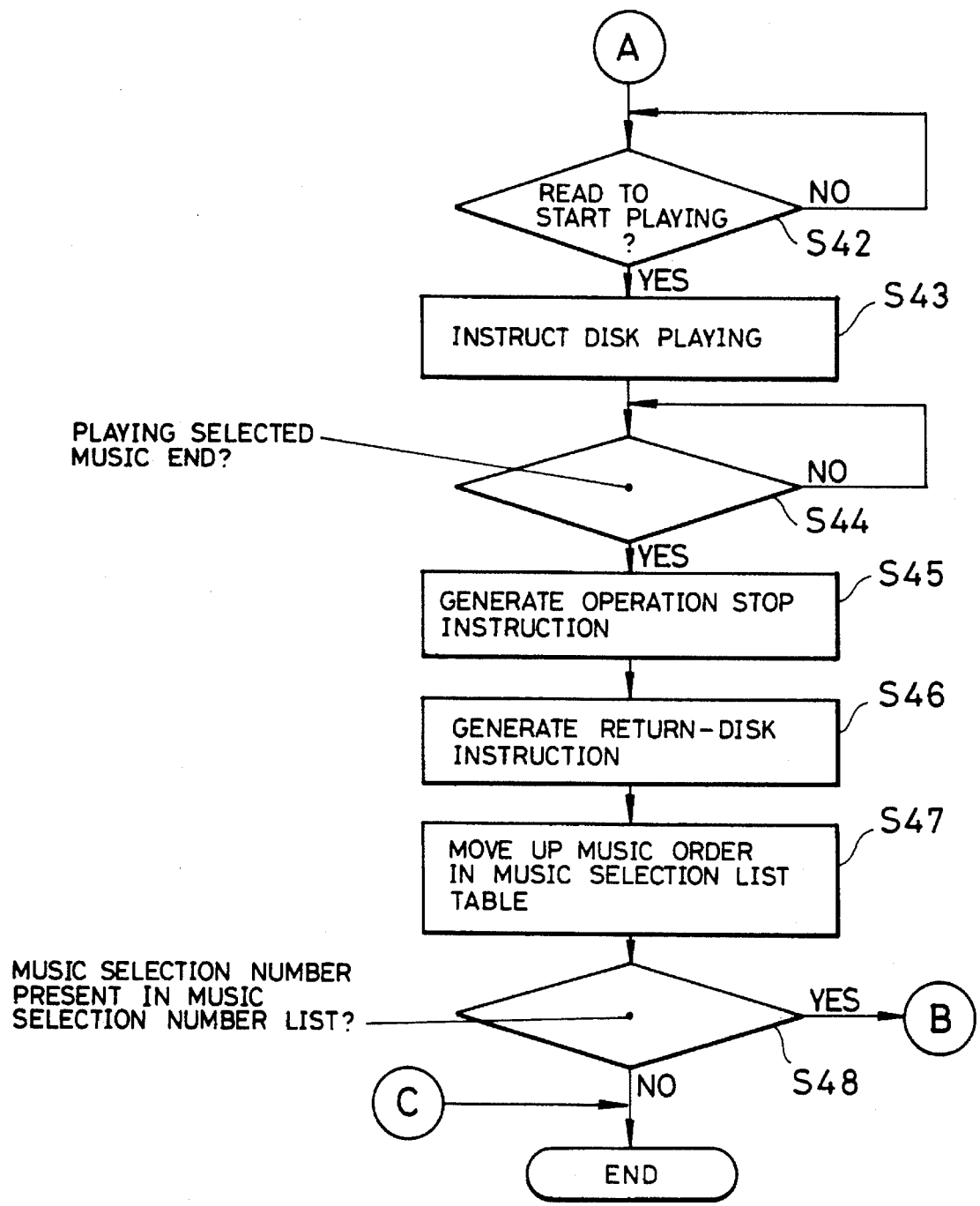

After executing step S39, S40 or S41, the system controller 7 determines whether or not playing of the disk can be started (step S42), as shown in FIG. 7B. When disk playing is inhibited by a key operation on the operation section 15, for example, playing of the disk will not start. If playing of the disk is allowed, the system controller 7 instructs the player section 4 to play the disk from tracks corresponding to the read music number (step S43). As a result, the player section 4 starts playing the music specified by the music selection number and the respective reproduced video signal and audio signal are supplied to the display 22 and the loudspeaker 19.

When the user designates the vocal part of the first part through a key operation, the audio signal of the fourth channel is reproduced and the vocal sounds of the second part are output together with the karaoke music from the loudspeaker 19. Accordingly, the user would sing the first part along the sounds reproduced from the loudspeaker 19. When the user designates the vocal part of the second part, the audio signal of the third channel is reproduced and the vocal sounds of the first part are output together with the karaoke music from the loudspeaker 19. In this case, the user would sing the second part along the reproduced sounds. Even if the selected music is a non-multi-audio type or it is a multi-audio type when singing of both parts is designated, the audio signals of the first and second channels are reproduced and only the karaoke music (instrumental accompaniment) is reproduced from the loudspeaker 19. When singing of both parts is selected, therefore, at least two persons would sing along to the instrumental accompaniment.

After executing step S43, the system controller 7 determines if playing of the selected music has completed (step S44). The decision is carried out in accordance with the time data in the control data which is supplied from the data separator 6 at the time of the disk playback. When playing of the selected music is ended, the system controller 7 sends the operation stop instruction to the player section 4 (step S45) and sends the return-disk instruction to the disk carrier 3 (step S46). As a result, the player section 4 stops rotating the turn table, after which the disk carrier 3 moves the disk on the turn table to its specified disk position in the disk stocker 2. After generating the return-disk instruction, the system controller 7 moves up the music order in the music selection list table by one (step S47), and determines if the music selection number is recorded at the top of the music selection list table (step S48). If the music selection number is recorded there, the system controller 7 returns to step S32 and repeats the above-described sequence of processes. If no music selection number is recorded at the top of the music selection list table, on the other hand, the disk playing operation will be terminated.

Although the audio decoder 8 restores the audio data on the channel specified by the channel playback instruction in the above-described embodiment, the audio decoder 8 may restore the audio data of four channels, and then may select the audio data on the channel specified by the channel playback instruction before conversion to analog signals. Alternatively, after converting the audio data on the four channels to analog signals, the audio decoder 8 may selectively output only the signals on the specified channel.

According to this embodiment, for a song having two parts like a duet song, the vocal sounds of one part are recorded together with the karaoke music on the third channel while the vocal sounds of the other part are recorded together with the karaoke music on the fourth channel. The disk may have only the vocal sounds of one part recorded on the third channel while having only the vocal sounds of the other part recorded on the fourth channel. In this case, when the vocal part of one of the two parts is designated by the user, the karaoke music recorded on the main channels should be reproduced and mixed with the vocal sounds (audio data) on the third or fourth channel.

Further, the recording medium is not limited to a disk, and other types of recording media, like a tape, may be used as well.

In short, the karaoke reproducing apparatus according to the present invention allows a user to specify one vocal part or both vocal parts of two parts when one piece of music selected from a plurality of pieces of music by the user is a multi-audio type, reproduces only instrumental accompaniment (karaoke) when both parts are specified, and reproduces the vocal sounds of an unspecified one of the two parts together with the instrumental accompaniment when only one part is specified. Even when there is no partner to sing a duet song, the user can sing a two-part song alone, thus increasing the number of pieces of music that the user can select to sing along.

What is claimed is:

1. A karaoke reproducing apparatus comprising:

a recording medium having a main channel on which signals each representing instrumental accompaniment of each of a plurality of pieces of music are recorded, and two subchannels for multi-audio music having two vocal parts, included in said plurality of pieces of music, one of said subchannels being recorded with a signal representing at least vocal sounds of one of two parts and the other subchannel being recorded with a signal representing at least vocal sounds of the other one of said two parts;

means for generating a music selection instruction indicating one piece of music among said plurality of pieces of music in accordance with an operation;

playing means for playing said recording medium for said one piece of music specified by said music selection instruction;

discrimination means for discriminating whether or not said one piece of music specified by said music selection instruction is a multi-audio type;

means for designating one of vocal parts of two parts or both vocal parts thereof when said one piece of music specified by said music selection instruction is determined as a multi-audio type by said discrimination means; and reproducing means for reproducing a signal on at least one of said main channel and said two subchannels corresponding to the designated vocal part or vocal parts, when said recording medium is played by said playing means.

2. The karaoke reproducing apparatus according to claim 1, wherein discrimination information indicating multi-audio type music is recorded on said recording medium, and said discrimination means has a memory for storing, in advance, said discrimination information read from said recording medium and discriminates whether or not said specified one piece of music is a multi-audio type from contents of said memory.

* * * * *